though a welding tool constructed according to my present invention.

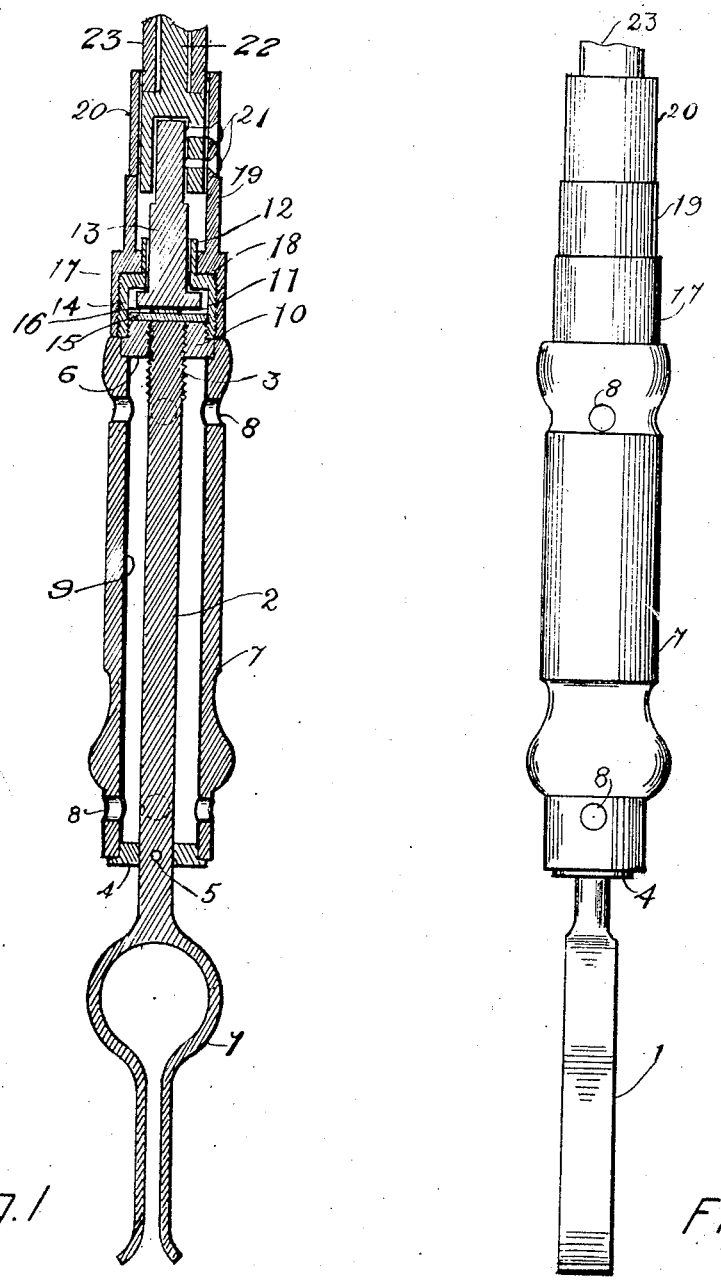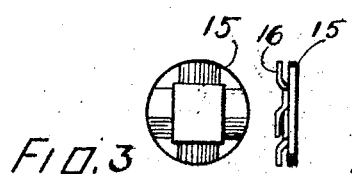

UNITED STATES PATENT OFFICE.

GEORGE A. ENGSTROM, OF TOPEKA, KANSAS.

ELECTRIC WELDING-TOOL.

1,295,457.  Specification of Letters Patent.  Patented Feb. 25, 1919.

Application filed February 18, 1918, Serial No. 217,935. Renewed November 25, 1918. Serial No. 264,127.

*To all whom it may concern:*

Be it known that I, GEORGE A. ENGSTROM, a citizen of Sweden, residing at Topeka, in the county of Shawnee and State of Kansas, have invented certain new and useful Improvements in Electric Welding-Tools, of which the following is a specification.

This invention relates to improvements in electric welding tools and one object is to provide a welding tool having a handle that may be rotated without breaking the electric circuit. A further object is to provide a welding tool having a handle cooled by ventilation. A further object is to provide a tool of this class that is simple in construction, efficient in operation and cheap to manufacture.

With the foregoing and other objects in view the invention consists in the combination and arrangement of parts to be hereinafter fully described, pointed out in the appended claims and illustrated in the accompanying drawing which forms a part of this specification and in which—

Figure 1 is a longitudinal sectional view through a welding tool constructed according to my present invention.

Fig. 2 is a side view of Fig. 1.

Figs. 3 and 4 are plan and edge views, respectively, of a contact spring employed.

Like reference characters denote corresponding parts throughout.

The reference numeral 1 denotes the chuck adapted to carry the usual carbon stick (not shown), the said chuck being formed with a shank 2 which is formed with screw threads 3 at one end. A collar 4 is made fast to said shank by a pin 5 and a nut 6 is carried at the threaded end of said shank. A rotary tubular handle 7 of wood or other insulating material for the said shank 2 is provided, said handle being carried by the said collar 4 and nut 6 and being formed with a plurality of perforations 8 for ventilation. A brass tubing 9 carried interiorly of the said handle 7 is formed with perforations in alinement with the perforations 8 of the said handle.

The said nut 6 is formed with a reduced exteriorly threaded portion 10 to which a threaded plug 11 is secured, which is formed with a neck 12. A conductor 13 extends through the neck 12 and is formed with a head 14 disposed in the said plug 11, said conductor being movable relatively to said plug and separated from the threaded end of the said shank 2 by the disk 15 formed with the bent resilient prongs 16 which contact with the head 14 of the conductor. The plug 11 is threaded exteriorly for engagement with the threaded portion of the jacket 17 which is formed with an inner annular shoulder or seat 18 that supports the said plug 11 and with a diminished portion 19 that extends beyond the said plug and abuts a sleeve 20 that is secured by screws 21 to the cable 22, provided with insulation 23, and to the said conductor 13.

The electric current coming through the cable 22 and conductor 13 is, by the disk 15 and prongs 16, carried to the shank 2 without regard to any relative movement of the said parts.

What is claimed is:—

1. In a welding tool, a chuck provided with a shank having one threaded extremity, a collar fast to said shank, a nut arranged at the threaded end of said shank, an apertured handle connecting said collar and nut and encircling said shank, a plug carried by said nut and extending beyond the end of said shank, a jacket carried by said plug, a conductor carried by said jacket and plug, a disk formed with resilient prongs connecting said shank and conductor, and a cable associated with said conductor.

2. In a welding tool, a chuck provided with a shank having one threaded extremity, a collar fast to said shank, a nut arranged at the threaded end of said shank, a tubular apertured handle connecting said collar and nut and encircling said shank, a plug carried by said nut and extending beyond the end of said shank, a jacket carried by said plug, a conductor carried by said jacket and plug, a disk formed with resilient prongs connecting said shank and conductor, a sleeve terminally contiguous to said jacket, a cable, and connection between said cable, sleeve and the said conductor.

In testimony that I claim the foregoing as my own I have hereto affixed my signature in the presence of two subscribing witnesses.

GEORGE A. ENGSTROM.

Witnesses:
BENNETT I. WHEELER,
MARGARET McGURNAGHAN.